United States Patent [19]

Mirdadian et al.

[11] 3,835,371
[45] Sept. 10, 1974

[54] APPARATUS FOR DETECTING THE PRESENCE OF ELECTRICALLY CONDUCTIVE MATERIAL WITHIN A GIVEN SENSING AREA

[76] Inventors: Mohammad Kian Mirdadian, 7020 Atwell; Robert J. Schwartz, 5446 Quinslock, both of Houston, Tex. 77035

[22] Filed: July 27, 1972

[21] Appl. No.: 275,757

[52] U.S. Cl. .................................... 324/3, 324/6
[51] Int. Cl. ......................................... G01v 3/10
[58] Field of Search ............ 324/1, 3, 4, 6; 340/410

[56] References Cited
UNITED STATES PATENTS

| 1,625,822 | 4/1927 | Potter ............................. 340/410 |
| 2,744,232 | 1/1956 | Shawhan et al. ...................... 324/3 |
| 2,995,699 | 8/1961 | Snelling et al. ....................... 324/4 |
| 3,014,176 | 12/1961 | McLaughlin et al. .................... 324/4 |
| 3,052,837 | 9/1962 | Arbogast et al. ................... 324/6 X |
| 3,214,686 | 10/1965 | Elliot et al. ............................. 324/6 |
| 3,214,728 | 10/1965 | Higgins ............................. 324/3 X |
| 3,471,772 | 10/1969 | Smith ................................... 324/3 |
| 3,525,037 | 8/1970 | Madden et al. .................... 324/6 X |
| 3,652,928 | 3/1972 | Mansfield ....................... 340/410 X |

Primary Examiner—Gerard R. Strecker
Attorney, Agent, or Firm—Torres & Berryhill

[57] ABSTRACT

A transmitter having a tuned LC circuit which is driven at resonant frequency by alternating current supplied by a digital, square wave pulse circuit is employed with a detector provided by a second tuned LC circuit which is resonant at the transmitter frequency. The winding axis of the detector coil is perpendicular to the winding axis of the transmitter inductance coil. The detector produces an output signal at the transmitter frequency when electrically conductive materials alter the mutual inductance between the coils in the two circuits. The detected signal is amplified and filtered by active, passive and synchronous filtering means and the resulting signal is transmitted to a remote location for analysis. When employed to detect the presence and location of underwater materials, the transmitter circuit and the amplifying and filtering circuits are included in a submerged probe which is connected to a surface vessel by a cable. The connecting cable preferably carries only direct current to reduce noise and eliminate the effect of cable length on proper circuit operation.

10 Claims, 4 Drawing Figures

Fig. 3

APPARATUS FOR DETECTING THE PRESENCE OF ELECTRICALLY CONDUCTIVE MATERIAL WITHIN A GIVEN SENSING AREA

BACKGROUND OF THE INVENTION

1. Field of the Invention

The present invention relates to means to detect the presence of electrically conductive materials or other magnetic flux changing means within a sensing area. In a specific application, the present invention is employed to locate pipelines which may be buried in the mud below a body of water. In other applications, by way of example, the apparatus of the present invention may be employed to detect the presence of concealed metal weapons in packages or carried by persons boarding aircraft or entering banks or other establishments.

2. Brief Description of the Prior Art

One well known technique for detecting the presence of materials within a defined area involves the transmission of a radio frequency or audio frequency signal and the analysis of the reflected signal. By examining the amplitude, wave shape and phase of the reflected signal, information regarding the type and location of the material producing the reflected signal may be deduced. While this technique is generally satisfactory for a great many applications, the circuitry and equipment involved are rather elaborate and precise information regarding the exact location of the object producing the reflected signal is difficult to obtain. For example, such a technique would not ordinarily be satisfactory to determine the location and buried depth of an underwater pipeline.

Another well known technique employs the use of a magnetometer. In this technique, a primary signal is employed to induce a secondary magnetic signal in electrically conductive material and the secondary signal is studied to determine the type and location of the conductive material. While the technique has many beneficial applications, it too is generally unsuited for use in determining precise locations. Both of the previously described techniques provide some general indication of the type and location of materials but, without significant modifications, neither technique gives sufficient information to readily permit precise location of hidden or obscured objects.

A third technique which is much more suited to the precise location of electrically conductive materials which are relatively close to a detecting probe is exemplified in U.S. Pat. No. 3,052,837. The patent describes a device in which the winding axis of a tuned oscillator coil is fixed substantially at right angles to the winding axis of a similarly tuned detector coil. Because of the right angle axis orientation, very little mutual inductance occurs between the two coils. When ferrous metal is present to alter the flux distribution pattern established by the oscillating current flow in the oscillator coil, increased mutual inductance occurs and a signal at the oscillator frequency is formed in the detector. The greater the amount of material present and the greater its magnetic permeability, the greater the amplitude of the secondary signal induced in the detector coil. By employing this third technique, the location of various materials may be precisely determined, particularly where the dimensions of the object being sought are known.

In an exemplary application of the last mentioned technique, the location of a pipeline buried in the mud below the bottom of a water body can be accurately determined by dragging a probe which carries the oscillator and detector coils back and forth over the bottom surface. The resulting signals obtained from the probe are analyzed by equipment on a surface vessel to determine the orientation of the pipeline and its depth below the water bottom. Such precise information is desired for example by deep sea divers who must dig out a portion of the buried pipeline to expose it for repair or modification.

While devices such as the type described in the previously mentioned patent have been capable of providing precise information regarding the location and orientation of a pipeline or other submerged objects having known dimensions and configurations, the problems associated with obtaining the required sensitivity, calibrating the circuitry in the probe and then analyzing the resultant detected signal have been extreme. Heavy, bulky and expensive geophysical transformers have been required to filter out unwanted signals to increase the signal-to-noise ratio of such prior art devices to an acceptable value.

In these same prior art devices, a transformer produced, sinusoidal waveform is employed to control current flow in the oscillator. If the control signal is not precisely symmetrical, a complex nonsymmetrical waveform is emitted from the transmitter making it difficult to separate the desired transmitter induced signal from undesired noise. For this reason as well as others, devices of the known prior art have been so sensitive to stray noise that the initial calibration has required removing the probe to a location which is far removed from sources of electrical noise. Once in this relatively noise free location, the necessary fine adjustments required to achieve desired operating characteristics for the device may still take days to complete.

The described prior art probe is designed to be towed behind a surface vessel and requires a separate probe for each different length of connecting cable which is to be employed. This need arises because the cable is part of the oscillator output circuit means whose power drive is on the surface. Thus, in the prior art design, the cable connecting the surface vessel and the probe must carry the high amplitude, alternating current employed to drive the output oscillator coil as well as the small amplitude detected signal which has the same frequency as the oscillator coil signal.

In this latter prior art device, each individual probe normally includes a nulling coil which is employed to compensate for coil misalignment and the effect of nonsymmetrical housing structure. The nulling coil must be adjusted in a low noise atmosphere and cannot be properly adjusted on the vessel. Thus, if the probe is damaged or strikes an obstruction causing it to loose its necessary tuning, another probe must be available on the vessel or the searching effort must be terminated. Because of these problems, as well as others, it has been extremely difficult and time consuming to build, calibrate and operate prior art devices of the type described.

SUMMARY OF THE INVENTION

The apparatus of the present invention provides noise reduction and substantially increased sensitivity in a system of the type which employs changes in the flux linkage between a transmitting oscillator coil and a receiving detection coil to determine the presence and location of electrically conductive materials within a given sensing area. The design of the present invention permits the oscillator circuitry driving the transmitting coil to be closely connected to the oscillator coil and physically separated from the conductor carrying the detected signal so that the noise effects of alternating current in the oscillator drive circuit and oscillator output coil are significantly reduced. By thus eliminating the cable effect, the length of the cable connecting a probe with a surface vessel may be changed without requiring recalibration of the circuitry within the probe.

Superior filtering is also obtained by the apparatus of the present invention without the need for geophysical transformers by employing a synchronous detector which forms an output in response to only those detected signals which have the frequency of the oscillator output signal and a specific phase relationship with the oscillator output signal. The synchronous detector employs a reference signal from the oscillator driving circuit to control its operation. Suitable phase shifting adjustments are included in the circuitry to compensate for amplifier caused phase differences between the detected signal and the oscillator output signal so that the signal fed to the synchronous detector may have a desired phase relationship with that of the oscillator output signal.

The oscillator driving circuitry of the present invention produces a symmetrical sinusoidal output waveform in the transmitter oscillator coil so that the waveform of the transmitted energy is substantially free of harmonic components. This is done by employing a digital oscillator to control the flow of alternating current in the transmitter oscillator coil. Precisely controlled square wave pulses from the digital oscillator regulate conduction of two power transistors to insure that both the positive and negative half cycles of the transmitted signal are exactly symmetrical.

Integrated circuits (IC's) are also employed in the present invention so that the inherent balance of the IC's may be used to advantage with the balanced signal transmitted from the oscillator coil to provide improved circuit sensitivity. The increased sensitivity which is obtained by the use of symmetrical, well shaped oscillator output signals, balanced IC's and the synchronous detection technique of the present invention increases the system's tolerance to coil misalignment, housing and coil mounting irregularities and nonsynchronous sources of noise. The increased sensitivity also permits the use of a wider choice of materials in the construction of the probe structure.

The apparatus of the present invention preferably employs only a single power source which, when the apparatus is used to locate submerged pipelines, may be carried on the surface vessel. A DC to DC converter using an IC regulator is employed within the probe to provide the desired DC potentials for operating the integrated circuits thereby eliminating the need for batteries in the probe. The converter is operated at a frequency which is different from the frequency of the transmitted signal to prevent noise introduction. With the design of the present invention, the connecting cable is not part of the oscillator driving circuit and as a result, the effect of noise caused by AC in the cable is significantly reduced so that if desired, the probe circuitry may be powered and controlled by AC power supplied through the connecting cable.

The apparatus of the present invention is capable of detecting and amplifying a transmitted signal in an electrically noisy environment and the initial calibration of the apparatus can be accomplished in an electrically noisy environment.

Means are provided for verifying proper functioning of a submerged probe and a surface operated gain control is provided for changing the sensitivity of the apparatus. The apparatus of the present invention also determines whether the detected material is ferrous or nonferrous by providing a given polarity output signal for ferrous metals and an opposite polarity output signal for nonferrous conductors. Protective means are included in the probe circuitry to prevent large amplitude noise signals from damaging the amplifying and filtering circuitry and a current limiting resistor is employed to prevent a short circuit in the output cable from damaging the probe circuitry.

The foregoing objects of the invention and other features and advantages of the invention will be more readily appreciated from the following specification, drawings and the related claims.

DESCRIPTION OF THE ILLUSTRATED EMBODIMENTS

Figures 1, 2, 4:
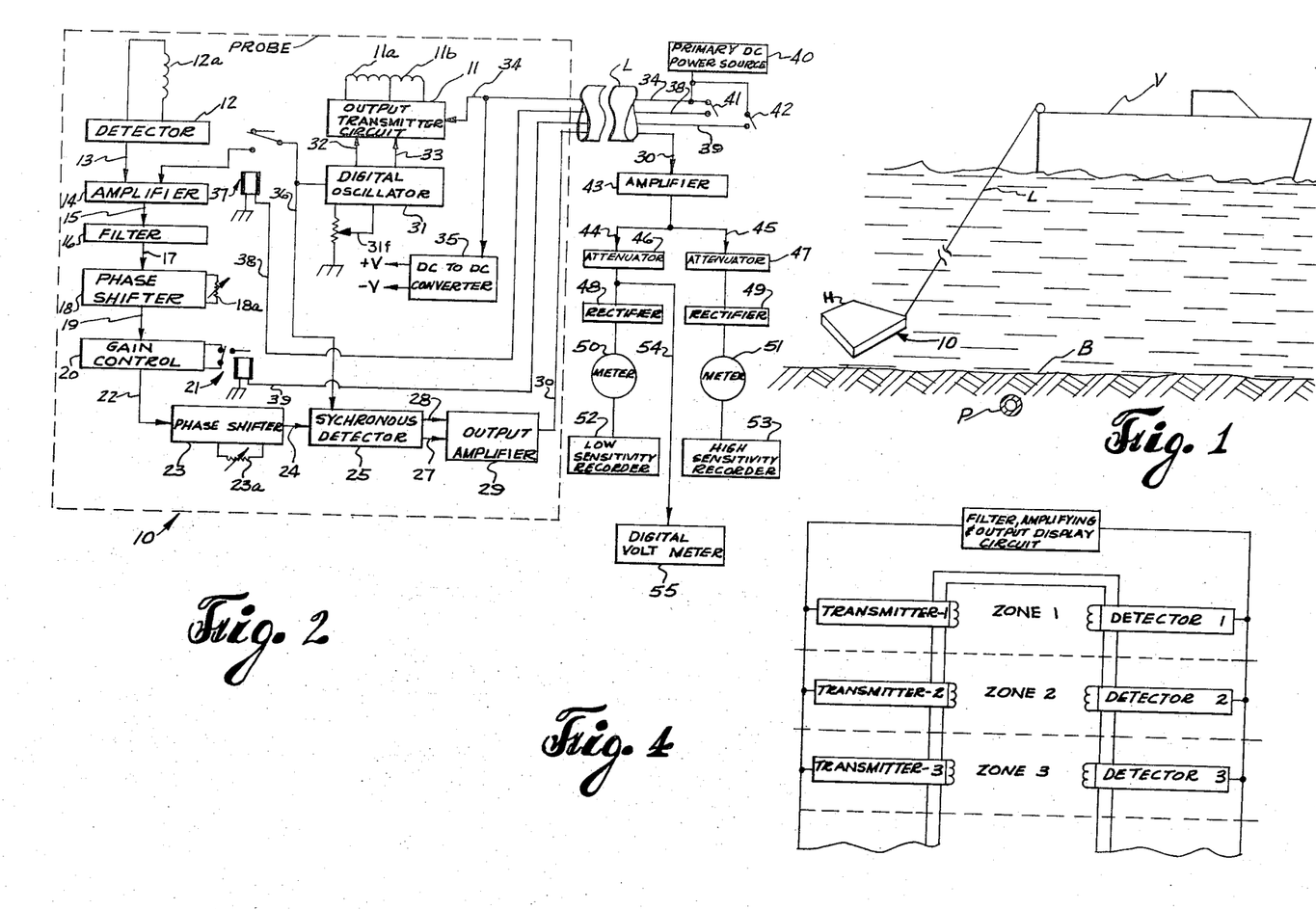
FIG. 1 illustrates the apparatus of the present invention being towed through water by a surface vessel to locate a buried pipeline.
FIG. 2 is a schematic block diagram showing the circuitry contained in the probe of the present invention and the equipment which may be carried in the surface vessel.
FIG. 4 is a schematic block diagram illustrating a modified form of the present invention employed to detect the presence and location of electrically conductive objects moving through a passage.

In FIG. 1 the subsurface probe of the present invention indicated generally at 10 is shown being towed behind a surface vessel V by a connecting cable or line L in an attempt to locate a pipeline P buried below the water bottom B. When the probe 10 comes close enough to the pipeline P, an output signal is formed by the probe and conveyed over the line L to the vessel V. The characteristics of the output signal can be employed to determine the orientation of the pipeline P and its distance below the bottom B. The probe 10 includes a housing H made of brass or aluminum or other nonferrous material.

The block diagram of FIG. 2 schematically depicts the circuitry contained within the probe 10 and the circuitry and equipment carried aboard the vessel V. The probe 10, shown enclosed by a dashed line, includes an energy transmitting means 11 having a single center tapped, resonated oscillator coil schematically depicted by coil sections 11a and 11b which form an energy field within a given sensing area. The coil sections 11a and 11b are preferably arranged physically within the probe 10 so that the opposite ends of the composite oscillator coil may be alternately driven to produce and transmit an AC signal. Suitable wave shaping means are included in the circuit 11 so that the current flowing in the coil sections 11a and 11b assumes a sinusoidal waveform.

The signal received by the detector 12 is partially produced by the energy transmitted from the transmitter 11 and varies as a function of the nature and position of the matter contained within the sensing area between the oscillator coil 11a, 11b and a detector coil 12a. The detector 12 forms an output signal over the line 13 representative of the quantity and/or quality and/or location of the matter contained within the sensing area. This output signal which includes noise components is amplified by an amplifier 14 and provided on a line 15. The amplified signal is then applied to a filter circuit 16 which partially filters the output signal to remove noise signals having given frequency characteristics. The partially filtered, amplified signal is transmitted over a line 17 to a phase shift circuit 18. The circuit 18 shifts the phase of the signal appearing at its input and reproduces the phase shifted signal on the line 19 for a purpose to be hereafter described. The amount of phase shift between the input and output of the circuit 18 is regulated by an adjustable resistor 18a.

The amplified, filtered, and phase shifted output signal on the line 19 is applied to a gain control circuit 20 which amplifies the signal in an amount dependent upon the setting of a relay control 21. The output signal from the circuit 20 is provided on a line 22 providing the input to a second phase shifter 23 which provides an output signal on a line 24 which is shifted in phase with reference to the signal appearing on the line 22. The resulting filtered, phase shifted and amplified signal is input to a synchronous detector 25 which significantly filters out undesired noise by producing a response to only those components of the signal on the line 24 having a predetermined phase relationship with the transmitter signal and the same frequency as the transmitter signal. In the preferred form of the invention, the detector 25 produces an output in response to that part of the input signal which is in phase with the transmitter signal.

When a particular type of metal is detected, the positive half cycles of the sinusoidal signal output from the detector 25 are provided on an output line 28. The polarities of the signals appearing on the lines 27 and 28 are reversed and are positive or negative depending on whether ferrous or nonferrous materials are being detected. The signals on the lines 27 and 28 are applied to a converter and output amplifier circuit 29 which converts the differential input to a single ended output, amplifies the signal and provides a direct current output signal on the line 30. This DC output signal is conducted from the probe 10 through the line L to equipment on the surface vessel V. In the preferred form of the invention, a positive voltage level between the values of zero and ten volts appears on the line 30 when ferrous material is present within the sensing area. The amplitude of the positive voltage level is a function of the distance of the material from the detector and oscillator coils, and the type, density and dimensions of the detected material. A negative voltage signal is produced on the line 30 when nonferrous conducting material is detected in the sensing area.

Control of current flow in the transmitter oscillator coil sections 11a and 11b is accomplished by a digital oscillator circuit 31 which supplies square wave pulses over output lines 32 and 33. A potentiometer 31f permits the pulse widths of the signals on the lines 32 and 33 to be adjusted relative to each other as required to produce a perfectly symmetrical output signal from the oscillator coil 11a, 11b of the transmitter. Electrical power for driving current through the oscillator coil sections 11a and 11b is obtained through a line 34 extending to the surface vessel. A DC to DC converter 35 connected to the line 34 supplies regulated DC voltages required by the various circuits included within the probe 10. While DC power is preferred, the design of the present invention permits the use of AC power without unduly reducing the signal to noise ratio of the signal conveyed to the surface.

A reference signal employed to control operation of the synchronous detector 25 is communicated from the oscillator 31 to the detector 25 over a line 36. The phase shifters 18 and 23 are employed to change the phase of the desired component of the detected signal relative to the phase of the transmitted signal to compensate for any phase shift occurring between the two signals. By this means, the reference signal appearing on the line 36 is exactly in phase with the desired component of the detected signal so that the detector operation can be precisely controlled. A verification relay 37 is operable to feed a calibrated portion of the digital signal on the line 36 directly to the amplifier 14 to verify that the probe circuitry is operating properly.

The surface equipment includes a primary DC power source 40 which is preferably, a 12 volt storage battery such as is commonly employed in electrical systems of automobiles. A switching means 41 is employed to provide a DC potential on a line 38 which in turn energizes the relay 37 to communicate a calibrated portion of the digital pulse directly to the detector for verifying the proper operation of the probe equipment. A second switch 42 is employed to form a DC potential on a line 39 to energize the relay 21. When the relay 21 is energized, the gain of the circuit 20 is increased to increase the sensitivity of the system.

While the present invention has been described with a DC power supply providing the sole source of power and control for the probe circuitry, if desired, alternating current at a frequency different from that of the transmitted signal frequency may be communicated to the probe through the connecting cable for powering and controlling the probe circuitry.

The detected signal conducted over the line 30 is supplied to an amplifier 43 which provides the amplified signal on two output lines 44 and 45. These signals are supplied through two separate channels to attenuators 46 and 47, rectifier circuits 48 and 49, metering devices 50 and 51, and recorders 52 and 53. The signal output from the attenuator 46 is supplied over a line 54 to a digital volt meter 55.

The attenuators include adjustment means for separately reducing the amplitude of signals appearing on the lines 44 and 45. The circuits 48 and 49 rectify the detected signal and provide a positive DC signal to meters 50 and 51 which provide a dynamic display of the detected signal. The recorders 52 and 53, which may be strip chart recorders, are employed to provide a permanent record of the detected signal over an extended period of time. The digital volt meter 55 is employed to determine the polarity of the detected signal as well as its presence.

In operation, the DC power source 40 supplies direct current voltage to the transmitter circuit 11 and to the DC to DC Converter 35. The converter voltages, "+V" and "−V" are employed to supply the circuitry of the digital oscillator circuit 31 which in turn forms two trains of precisely spaced, constant length square wave pulses over lines 32 and 33. The pulses in the two trains are 180° out of phase with each other. The pulse in the line 32 controls the formation of one half cycle of the transmitted sinusoidal signal and the pulse in line 33 controls the formation of the other half cycle of the signal. By this means, with a positive digital pulse employed to control current flow in the coil sections 11a and 11b, the resulting sinusoidal waveform of the current flow through the coil sections 11a and 11b is substantially perfectly formed and exactly symmetrical. Because of its perfect form, such a waveshape permits greater sensitivity in the detector circuitry than is possible when complex waveforms are transmitted.

During the initial calibration of the detector circuitry the potentiometer 18a in the phase shifter 18 is adjusted to shift the phase of the desired component of the detected signal s required to match it with the phase of the digital pulse signal on the line 36. The adjustment may be accomplished while simultaneously monitoring the signals on the lines 19 and 36 with an oscilloscope or other means. If necessary to achieve an exact phase relationship, a second potentiometer 23a in the second phase shifter 23 may be adjusted until the signal on the line 24 is exactly in phase with the square wave pulses on the line 36. While two separate phase shifting steps have been found to be advantageous, it will be appreciated that the entire control of the phase of the detected signal relative to the driving pulse on the line 36 may be controlled by a single circuit.

With the latter adjustments, the synchronous detector 25 functions to form a response to those signal components appearing on the line 24 which are in phase with the driving signal and since the frequency of the induced signal in the detector 12 is of necessity the same as that of the transmitted signal, a very high level of filtering is produced by the detector 25.

During initial attempts to locate the position of the pipeline P, the gain control circuit 20 is set at its highest gain and the low sensitivity recorder 52 and the high sensitivity recorder 53 are simultaneously operated to provide two separate permanent records of the signal appearing on the line 30. When the sensing area of the probe 10 is drawn close enough to the pipeline P, the meter 51 on the high sensitivity side of the output circuitry will begin to show a deflection which will continue to increase as the probe is drawn closer to the pipeline P. The meter 50 monitors the same signal which is provided at its input at a much lower amplitude, preferably that at which full scale deflection occurs on the meter when the highest possible amplitude output signal is present on the line 30. The high and low sensitivity recorders are required since information regarding the pipe location is lost where the high sensitivity meter exceeds its scale limitations.

The rectifiers 48 and 49 are employed to provide positive level DC voltages to the meters 50 and 51 irrespective of the polarity of the detected signals on the line 30. The digital volt meter 55 provides an indication of the polarity of the signal to provide the information regarding the type of material being detected. If desired, the meters 50 and 51 may be center zero meters with scale deflections to either the right or the left in which case the rectifiers 48 and 49 could be omitted.

Figure 3:
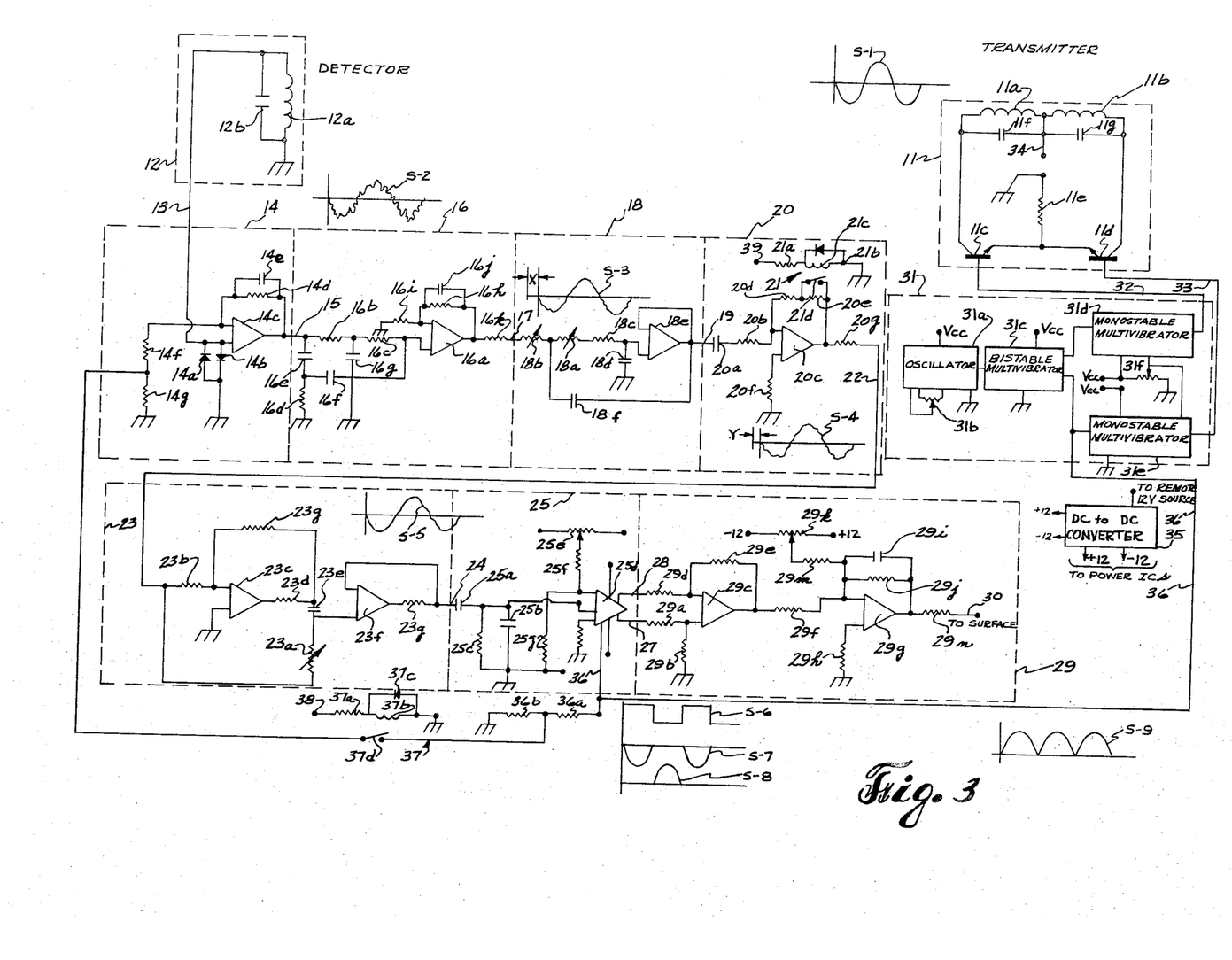
FIG. 3 is a more detailed schematic diagram showing the circuitry employed in the probe of the invention.

FIG. 3 shows details of the circuitry contained within the probe 10 of the present invention. The detector 12 includes the inductance coil 12a connected in parallel with a capacitor 12b to form an LC circuit. One end of the parallel circuit goes to the chassis ground and the other end is connected to the line 13 and input to the amplifier 14 which amplifies the low level signal on the line 13 and provides an amplified signal on the line 15. The line 13 is connected to two diodes 14a and 14b connected to conduct in opposite directions to prevent large amplitude noise spikes induced in the detector coil 12a from damaging the following circuitry. In the preferred form of the invention in which the apparatus is designed to be employed to detect submerged pipelines, the diodes 14a and 14b conduct in the forward direction when the potential difference between anode and cathode is approximately 600 millivolts. Positive voltages in excess of this value will be clipped by diode 14b and negative voltages in excess of this amplitude will be clipped by diode 14a.

The signal on the line 13 is input to the noninverting input of the operational amplifier 14c so that no signal inversion occurs between the amplifier input and output.

An integrating RC circuit formed by a resistance 14d and a capacitor 14e is connected between the output 15 and the negative, inverting input to the amplifier 14c. The operational amplifier 14c as well as the other amplifiers shown schematically in FIG. 3 are preferably IC operational amplifiers. The ratio of the resistance values for the resistance 14d to that of the combined value for resistors 14f and 14g connected between the negative, inverting input and chassis ground establishes the gain for the IC amplifier 14c. In a typical application, the gain of the amplifier 14c is approximately 50. The capacitor 14e is employed to integrate high frequency signals appearing on the output 15 to limit the high frequency response of the amplifier.

The signal appearing on the output line 15 is supplied to an active filter which includes a passive RC filter circuit and an IC operational amplifier 16a. The filter 16 is employed since the amplitude of the induced 50 or 60 Hz power line noise present in many typical lab, assembly or maintenance facilities may exceed the desired signal component. If the ambient external noise were not present in any significant amount, the synchronous detector could distinguish the desired signal component without the additional filtering. The RC network includes resistances 16b, 16c and 16d and capacitors 16e, 16f and 16g having values selected to suppress undesired AC power line noise signals, particularly 50 Hz and 60 Hz. The initially filtered signal is supplied to the positive input of the IC amplifier 16a. A feedback resistor 16h connected between the output of the amplifier and the negative input of the amplifier operates with a resistor 16i connected between the negative input and chassis ground to establish a gain of approximately 5 for the amplifier. A capacitor 16j in parallel with the resistance 16h suppresses the high frequency response of the amplifier. The amplifiers 16a and 14c may desireably be provided by a single IC.

The phase shift circuit 18 includes a low pass active filter which is well known in the art. In a low pass filter, frequencies near and above the turnover of the filter are affected by increasing phase shift. By adjusting the turnover frequency of the filter, a signal of a particular frequency can be subjected to a controllable phase shift. Variable resistors 18a and 18b provide the means for adjusting the turnover frequency and consequently the phase shift as required to obtain the best signal to noise ratio. Resistor 18c and capacitors 18d and 18f are fixed components in the low pass filter which also includes a buffer amplifier 18e.

The output from the amplifier 18e is supplied over the line 19 to a DC blocking capacitor 20a and then supplied through an input resistor 20b to the negative, inverting input of an IC operational amplifier 20c. Two resistances 20d and 20e are connected in series between the output and the negative input of the amplifier to provide a negative feedback loop. A resistance 20f is connected between chassis ground and the positive input to the IC amplifier 20c and a current limiting resistor 20g is connected in the output line from the amplifier.

The relay 21 includes a resistance 21a connected in series with a parallel connected relay winding 21b and semiconductor diode 21c. Current flow supplied from the line 39 through the current limiting resistor 21a and winding 21b functions to move a switching contact 21d to open or closed position. Whether such current flow opens the switch or closes it, is determined by employing either a normally open or normally closed switch with current flow designed to change the normal condition of the switch. The semiconductor diode 21c prevents current flow in the reverse direction from moving the switching contact 21d. When the contact 21d is closed, the resistor 20e is electrically removed from the feedback loop to substantially decrease the gain of the amplifier 20c. With the resistance 20e included in the feedback loop, the gain of the amplifier 20c is preferably 10 times greater. Preferably, the amplifiers 20c and 18e are part of a single IC.

The output signal from the amplifier 20c is formed on the line 22 where it is conducted through an input resistor 23b to the negative inverting input of an IC operational amplifier 23c. The positive input to the amplifier is grounded. The input signal to the amplifier is inverted once more so that the previous inversion occurring in the amplifier 20c is cancelled. The output from the amplifier 23 is supplied through an isolation resistor 23d and blocking capacitor 23e to the positive input of a second operational amplifier 23f. Amplifiers 23f and 23c are preferably formed by the same IC component. A negative feedback loop for the amplifier 23c is provided by a fixed resistance 23g connected between the negative input and the amplifier output. The resistor 23a is employed to regulate the amount of nonamplified, noninverted signal bypassed around the amplifier 23c. When the resistance value of 23a is very small, the signal at the input of the amplifier 23c is virtually the same as that at the input to the amplifier 23f. As the resistance of 23a is increased, the amplifier produces an increasing amplitude, inverted signal which is combined with the bypassed portion of the input signal. The net result is controllable phase shift of the signal over a relatively wide range.

The amplifier 23f functions as a buffer amplifier having a voltage gain of about one to prevent loading the output of the phase shifting network 23c. The output signal from the amplifier is fed through a series current limiting resistor 23g to the line 24 and then to a DC blocking capacitor 25a to provide the input to the synchronous detector 25. The signal is supplied across a grounded input capacitor 25b and a grounded input resistor 25c to two positive inputs of a gated detector 25d which is employed as a synchronous detector. Any circuit capable of performing the desired synchronous detecting function may be employed. For example, the Motorola IC part No. MC 1445L which is a gated detector employing a variable transconductance principle may be satisfactorily used for the detector 25d. Controlled voltages of ±12 volts are supplied to the detector 25d by the DC to DC converter 35. A desired DC bias for the output signal may be provided by the setting of a potentiometer 25e having its movable contact connected in series with a voltage divider network provided by resistors 25f and 25g. The voltage developed by current flow through the resistor 25g is supplied as one input to the detector 25d.

The reference or gate signal which regulates operation of the synchronous detector 25d is supplied over the line 36 as an input to the detector. The output signals on line 27 are conducted through a series resistor 29a to an input resistor 29b to provide the positive input to an operational, IC amplifier 29c. The signals on the line 28 are conducted through a series resistor 29d to the negative input terminal of the amplifier 29c. A feedback resistor 29e provides negative feedback between the output and the input of the amplifier. The signal on the line 28 supplied to the negative input of the amplifier 29c is inverted and amplified by 29c and the resulting signal is combined with the amplified signal on line 27 to provide a single ended output signal. The signal is conveyed through a series resistor 29f to the negative input of a second operational amplifier 29g. The amplifiers 29c and 29g are preferably provided by the same IC component. An input resistor 29h is connected between the positive input to the amplifier 29g and chassis ground. A negative, integrating feedback loop is provided by the parallel connection of a capacitor 29i and a resistor 29j connected between the output of the amplifier 29g and its negative input. A potentiometer 29k having its movable contact connected through a series resistor 29m provides a DC bias to provide a desired DC level for the signal appearing at the output of the amplifier 29g. The output signal from the amplifier 29g is supplied through a current limiting resistor 29n which prevents damage to the IC circuitry in the converter and output amplifier section 29 in the event the output lead 30 should be accidentally shorted to ground. The resistance elements in the potentiometers 29k and 25e are provided with ±12 volts by the DC to DC converter 35.

The relay 37 includes a current limiting resistor 37a, a relay winding 37b, and a semiconductor diode 37c connected in parallel with the winding. When the surface equipment is operated to provide a DC voltage on line 38, relay switching contact 37d is closed so that the square wave gate signal on the line 36 is conducted through series connected isolating resistances 36a and 36b and through the series input resistance 14f to the negative input of the amplifier 14c. This produces an input signal to the amplifier 14c which is carried through the detection circuit and reproduced at the surface monitoring equipment to verify that the probe is operating properly. When the DC voltage is removed from the line 38, the switching contacts 37d returns to its normally open position. The diode 37c prevents reverse current flow from operating the relay 37.

The digital oscillator 31 includes an IC oscillator 31a having a frequency of oscillation which is adjustable by changing the setting on a potentiometer 31b. The oscillator 31a is provided with a source of constant DC voltage (Vcc) of plus 5 volts. The oscillator 31a functions in a conventional manner to provide a time variant output signal which is supplied to a bistable multivibrator 31c. The bistable multivibrator 31c is also conventional being preferably provided by an IC component. It is operated as a conventional pulse divider, producing two square wave pulse trains, one of which is 180° out of phase with the other. The frequency of each of these output wave trains is one-half that of the input signal supplied by the oscillator circuit 31a.

The digital oscillator circuit may be operated at any desired frequency and by operating the oscillator circuit at a high frequency and employing dividing circuitry to produce a lower frequency of oscillation, component size may be reduced while still providing a low frequency transmitter output signal.

Square wave pulses rather than sinusoidal pulses are employed to provide optimum control over the shape of the transmitted waveform. The square wave pulses are supplied as inputs to conventional monostable multivibrators 31d and 31e which function in a conventional manner to form precisely spaced square wave pulses of uniform width. As with the other previously described components, the multivibrators 31d and 31e are preferably formed by integrated circuits. The square wave pulses formed on the lines 32 and 33 are employed to control conduction of two power transistors 11c and 11d respectively. The transistors 11c and 11d may preferably be Darlington power transistors which are characterized by their ability to control large amounts of current flow with a very small control signal. The emitters of the two transistors are coupled together and are connected through a resistor 11e to the chassis ground. Capacitors 11f and 11g are connected in parallel with windings 11a and 11b respectively. The values for the capacitors 11f and 11g are selected so that the LC combinations provide a resonant circuit at a desired output frequency. The common point in the two parallel LC circuits is connected by line 34 to the remote 12 volt DC power supply. The resistor 11e functions as a current controller to render the current drive to coil sections 11a and 11b substantially independent of cable length.

In operation, the winding axes of the transmitter coil sections 11a and 11b are coaxial and aligned at right angles to the winding axis of the detector coil 12a. When properly positioned and wound, there is nominal flux linkage between the oscillator and the detector coils in the absence of a flux conductive or disturbing material in the sensing area. Preferably, the coil sections 11a and 11b are part of a tuned LC circuit which resonates at 25Hz and the detector 12 includes a tuned LC circuit which resonates at the same frequency. Optimum energy transfer between the energy transmitting circuit 11 and the detector 12 occurs where the transmitting and receiving circuits resonate at the same frequency. While 25Hz is desired because of its compatability with existing equipment, the increased sensitivity of the present invention permits higher or lower frequencies to be used. The housing for the probe is preferably of a nonmagnetic material to minimize the coupling between the two coils.

The waveforms present at various points in the circuit are depicted at S-1 through S-9. With a well shaped sinusoidal current wave form S-1 being produced by the oscillator coil sections 11a and 11b, a signal such as that indicated as S-2 will be induced in the detector 12 when conductive materials or other sources of field disturbing means are present at a point relative to the probe 10 which produces some mutual inductance between the oscillator and detector coils. The signal induced in the detector 12 is represented by the waveform S-2 which shows noise signals impressed upon a sinusoidal wave having the same frequency as the transmitting signal S-1. The low level amplifier 14c increases the amplitude of the detected signal and improves the waveform slightly by suppressing those components of the signal which have a higher frequency than that of the oscillator output signal. The passive RC elements in the active filter remove the 60 Hz components of the signal and the amplifier 16a preferentially amplifies those components of the signal having the oscillator output signal frequency. The filtered signal is shown as waveform S-3. The output from the active filter 16 is shown shifted in phase by an amount "X." The phase shift is introduced by the amplifiers 14c and 16a.

The phase shifter 18 functions to alter the phase shift X so that the waveform S-4 is reproduced with a smaller amount of phase shift "Y." Depending upon the amount of phase shift X at the input, the phase shifter 18 may provide all or a portion of the desired phase shift. The second phase shifter 23 provides for additional phase shift if desired to compensate for any phase shift introduced by the amplifier 20c and that which will be introduced by the amplifier 23. As a result, a waveform S-5 is produced which, depending upon the desired circuit operation either bears an exact phase relationship with the oscillator signal or is exactly in phase with the signal. For purposes of illustration, the operation of the circuit has been described so that the signal produced at the input to the synchronous detector is adjusted to be exactly in phase with the signal output by the oscillator circuit. However, if desired, any exact phase relationship such as a 90° or 180° or other desired phase shift may be employed.

The gate signal on line 36 is illustrated as the square wave S-6, the negative half cycle of the detected signal which appears on line 28 is identified as S-7 and the positive half cycle which appears on line 27 is identified as S-8. The single ended output from the amplifier 29c is identified as S-9.

After the initial alignment of the circuitry within the probe, the probe may be suspended above a test section of pipe which is moved under the probe to produce a variation in the detected output signal. The signal amplitude may be plotted as a function of the pipe distance from the probe to form a characteristic curve for the particular pipe being tested. This is done for each different size or type of pipe or material which will be sought for by the equipment. By this means, the output signal may be compared with the appropriate curve to obtain very precise information regarding the location of the pipe.

FIG. 4 illustrates a modified form of the invention employed to detect the presence and to determine the location of flux disturbing materials moving through a passage way. The circuitry includes a plurality of separate transmitter-detector pairs which are operated to detect the presence of flux disturbing material within separate, contiguous zones. Suitable filtering, amplifying and output display circuitry of the type described previously may be employed to analyze the detected signals. With a system of the type illustrated in FIG. 4, passengers boarding aircraft, customers entering stores, and packages or the like moving along a conveyor belt may be examined for the presence of unauthorized objects such as weapons. Each of the detector-transmitter pairs operates in the manner previously described with reference to FIGS. 2 and 3 or, if desired may include suitable time sharing means so that the separate transmitter-detector pairs operate with the same, oscillating, filtering and amplifying circuitry.

The foregoing disclosure and description of the invention is illustrative and explanatory thereof, and various changes in the size, shape and materials as well as in the details of the illustrated construction may be made within the scope of the appended claims without departing from the spirit of the invention.

We claim:

1. Apparatus for detecting the presence of electrically conductive or magnetic flux disturbing means within a given sensing area comprising:
   a. mounting means including a submergible probe means;
   b. signal forming means carried by said mounting means;
   c. transmitting means connected with said signal forming means and carried by said mounting means for forming an energy distribution pattern in said sensing area;
   d. detecting means carried by said mounting means for forming a detector signal indicating a change in said energy distribution pattern caused by the presence of electrically conductive or magnetic flux disturbing means in said sensing area;
   e. treating means carried by said mounting means and connected with said detector means for amplifying and filtering said detector signal;
   f. electrical output conductor means extending from said mounting means to a remote location for conveying said amplified and filtered detector signal to receiving means at said remote location;
   g. verification means included in said probe means and operable from said remote location for communicating a known signal to said detecting means for verifying proper operation of said apparatus; and
   h. supply line means extending between said probe means and a source of remotely located, direct current voltage for supplying direct current voltage to power said signal forming means and said detecting means.

2. Apparatus as defined in claim 1 wherein:
   a. said transmitting means includes oscillator coil means for radiating electromagnetic energy to form said energy distribution pattern;
   b. said signal forming means includes oscillator circuit means for controlling the flow of electrical current in said oscillator coil means; and
   c. said detector means includes receiving coil means inductively coupled with said oscillator coil means in an amount dependent upon the characteristics of electrically conductive or magnetic flux disturbing means present in said sensing area.

3. Apparatus as defined in claim 2 wherein said oscillator coil means includes one or more inductive windings having a winding axis which is disposed at a right angle to the winding axis of one or more inductive windings included in said detector coil means.

4. Apparatus as defined in claim 2 wherein:
   a. said treating means includes integrated circuit means; and
   b. a DC to DC converter means is contained in said probe means for converting direct current supplied by said supply line means to direct current for supplying said treating means.

5. Apparatus as defined in claim 4 wherein said DC to DC converter means includes oscillating means producing time variant signals at a frequency which is different from the frequency of the signals radiated by said transmitter means.

6. Apparatus as defined in claim 2 further including:
   a. control line means extending between said remote location and said probe means for supplying direct current control signals to said treating means in said probe means; and
   b. means included in said probe means and responsive to said control signals for changing the gain of amplifying means in said treating means.

7. Apparatus as defined in claim 2 wherein:
   a. said treating means includes:
      i. synchronous detector means for filtering said detector signal;
      ii. phase shifting means for shifting the phase of the detector signal relative to the phase of a gate signal employed to control operation of said synchronous detector means whereby the detector signal is input to said synchronous means with a fixed phase relationship relative to said gate signal;
   b. said gate signal frequency is the same as that of the transmitted signal; and
   c. the detector signal input to said synchronous detector means is in phase with said gate signal whereby said synchronous detector means conducts only those parts of the detector signal which are in phase with and have the same frequency as the transmitted signal to thereby filter undesired noise from said detector signal.

8. Apparatus as defined in claim 2 further including:
   a. digital pulse means in said oscillator circuit means for forming two trains of precisely spaced, square wave pulses having constant pulse widths to produce a symmetrical waveform in the signal emitted by said oscillator coil means; and
   b. means for adjusting the pulse widths of the pulses in one train relative to those of the pulses in the other train.

9. Apparatus as defined in claim 2 further including:
   a. a plurality of contiguous zones in said sensing area;
   b. transmitting means and detecting means associated with each of said zones for detecting the presence of said electrically conductive or magnetic flux disturbing means in said zones; and
   c. indicating means for indicating which zone or zones contain said electrically conductive or magnetic flux disturbing means.

10. Apparatus as defined in claim 2 further including:

a. first output means at said remote location connected with said output conductor means and responsive to a relatively low level signal on said conductor means; and
b. second output means at said remote location connected with said output conductor means and responsive to a relatively high level signal on said conductor means.

* * * * *